Nov. 3, 1970

W. R. ISOM 3,537,710

CARTRIDGE DEBRIS TRAP

Filed April 8, 1968

INVENTOR
Warren R. Isom

BY Eugene M. Whitacre

ATTORNEY

United States Patent Office 3,537,710

Patented Nov. 3, 1970

3,537,710
CARTRIDGE DEBRIS TRAP

Warren R. Isom, Indianapolis, Ind., assignor to RCA Corporation, a corporation of Delaware Filed Apr. 8, 1968, Ser. No. 719,311
Int. Cl. G11b *3/58*
U.S. Cl. 274—47 5 Claims

ABSTRACT OF THE DISCLOSURE

A blocked pad is provided in a tape cartridge for the entrapment of loose debris produced during the operation of said cartridge.

This invention relates to tape cartridges, and more particularly to tape cartridges of the type receivable in a player apparatus for cooperation with a magnetic transducer head adapted to be received within the cartridge housing during operation thereof.

During a player apparatus operation with, for example, a magnetic tape cartridge of the type noted, there is a tendency for iron oxide particles, ferrite binders, and other products of tape wear to accumulate and adhere to the transducer head(s), causing a loss of high frequency response and an eventual reduction in the output signal level. To remove these deposits, cartridges are available containing a mildly abrasive tape effective in cleaning the transducer head(s). However, the problem encountered in the use of tape cleaning cartridges, as well as those containing magnetic tape, is that when one of these cartridges is operated and thereafter withdrawn from the player apparatus, the debris cleaned from or not adhering to the transducer head(s) is allowed to fall into the player apparatus and in time may cause jamming or malfunctioning of said apparatus.

It is an object of the present invention to provide an improved tape cartridge effective in minimizing the amount of loose debris allowed to collect within a cooperating player apparatus during cartridge operation and removal from said apparatus.

In accordance with the present invention, means are provided within a tape cartridge housing and arranged proximate a transducer head receiving opening so as to entrap and thereby retain loose debris produced by the coaction of the cartridge tape and a transducer head during operation of said cartridge.

The novel features which are considered to be characteristic of the invention are set forth with particularity in the appended claims. The invention, however, both as to its organization and method of operation, as well as additional objects and advantages thereof, will best be understood from the following description when read in connection with the accompanying drawing in which:

The present invention will be described in the context of an endless loop tape cartridge of the type including an internally mounted pressure roller and generally referred to as an 8-track cartridge. It will be undetrstood, however, that the invention is equally applicable for use in 4-track endless loop cartridges of the type adapted to receive an external pressure roller during operation thereof, reel-to-reel tape cassettes, and such other cartridge designs as may suggest themeselves to one skilled in the art.

Figure 1:
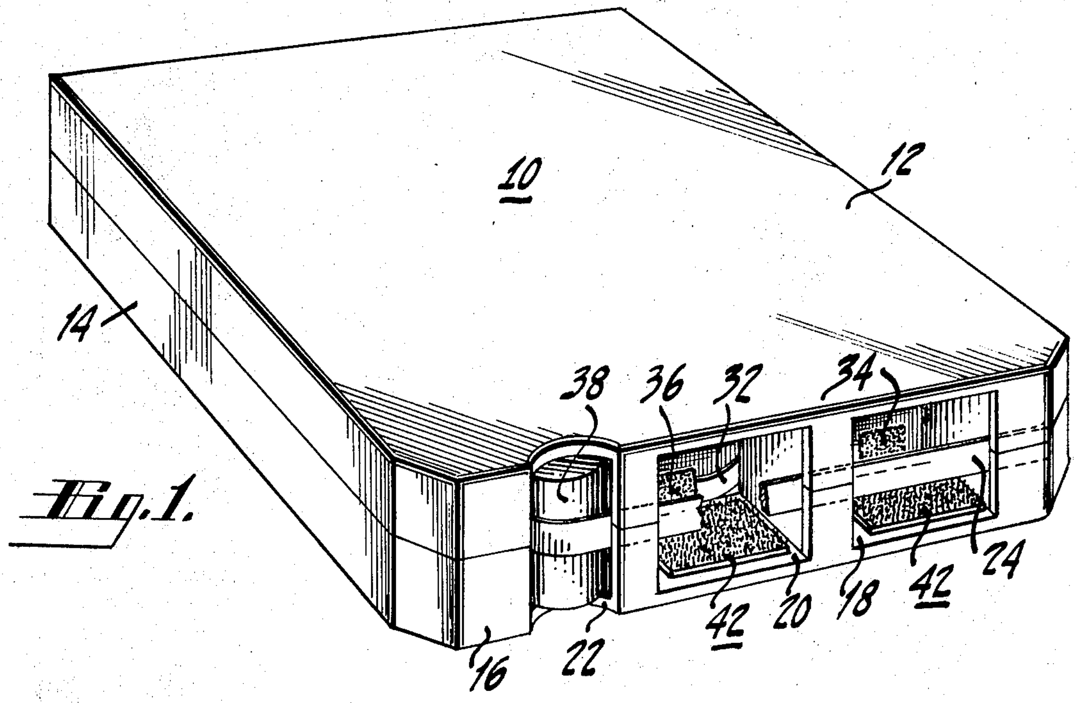
FIG. 1 is a perspective view of a tape cartridge embodying the present invention.
Figures 2, 3, 4:
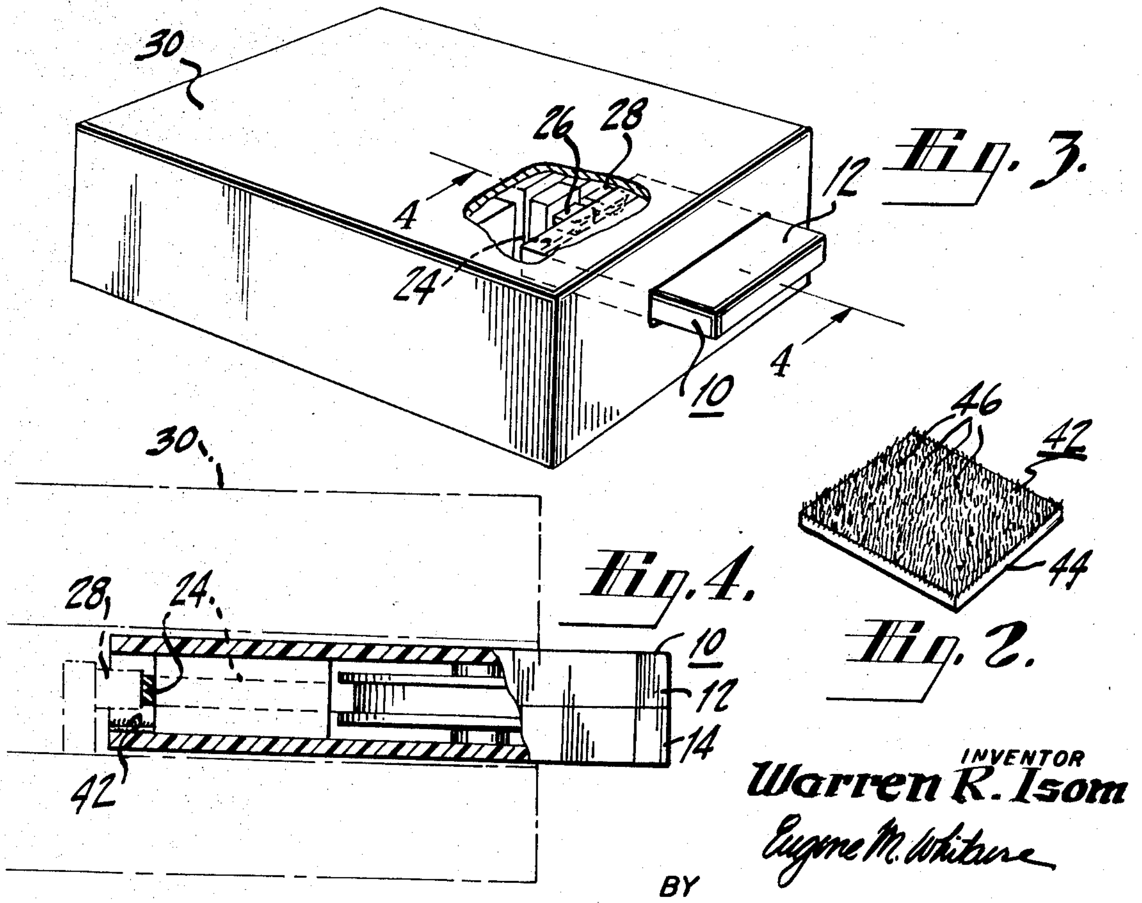
FIG. 2 is an enlarged perspective view of one of the flocked pad members shown in the cartridge of FIG. 1.
FIG. 3 is a perspective view of a tape player apparatus in operative cooperation with a received tape cartridge embodying the present invention.
FIG. 4 is an enlarged sectional view of the cartridge taken on lines 4—4 of FIG. 3.

Referring now to FIG. 1, the endless loop cartridge shown therein includes a rectangularly shaped casing or housing 10 having complementary top 12 and bottom 14 cover portions. The front, or forward end 16 of the cartridge, has three rectangular aperatures 18, 20 and 22 extending from right to left as viewed in FIG. 1. Apertures 18, 20 and 22 allow a tape 24 contained within the cartridge housing 10 to be exposed to operative contact with an erase or track sensing head 26, record-playback or transducer head 28 and drive capstan (not shown) respectively, of an associated record-playback or player apparatus 30, when the cartridge is inserted into the apparatus for operation thereof as shown in FIG. 3.

Spaced in from the forward end 16 of the cartridge is a spring member 32 having a pair of padded arms 34 and 36 in alignment with apertures 18 and 20 respectively. Behind aperture 22, a pressure roller 38 is rotatably mounted. When the cartridge is inserted into the player apparatus 30, the apparatus sensing and transducer heads are caused to be received within the cartridge housing through aperatures 18 and 20 respectively so that padded arms 34 and 36 effect a resilient engagement of the exposed tape 24 with the sensing head 26 and the transducer head 28 respectively while the roller 38 presses the tape 24 against the player apparatus drive capstan (not shown) to frictionally draw the tape from right to left across the front portion of the cartridge as viewed in FIG. 1, and consequently across the sensing and transducer heads respectively.

With use of cartridges containing a magnetic tape, there will tend to be a build up or accumulation on the transducer and sensing heads of an associated player apparatus of iron oxide particles and/or other remnants dislodged from the tape during operation of the cartridge. Some tapes may leave more deposits of this type than others. If the cartridge is of the type having a tape containing a special head cleaning compound, such as a mild abrasive formulated thereon, then during operation of the cartridge the debris cleaned from the player apparatus heads will be allowed to fall into the player, thereby endangering the trouble-free life thereof and in some instances causing a jamming or malfuctioning of the apparatus.

In accordance with the present invention a flocked pad 42 is secured within the cartridge as by an adhesive, adjacent each of the openings 18 and 20. The pads 42 are in such a position so as to be beneath the received sensing and transducer heads 26 and 28 respectively so that when the cartridge is operated, the debris that is removed from the heads or discharged from the tape itself during its coaction with heads falls directly on to the pads 42, and is entrapped within the flocked surface of said pads. As shown more particularly in FIG. 2, each pad 42 preferably comprises a backing material 44 such as Mylar and a dense grouping of fibers 46, deposited thereon as by electrostatic means so as to be vertically oriented. Thus, when the cartridge is operated, the debris produced falls onto the pads 42 and is prevented by the flocked surface of said pads from falling out of the cartridge into the player apparatus, either during said cartridge operation, or when the cartridge is removed from the player.

After removal of the cartridge from the player, the debris collected may be jarred loose and thereby easily removed from the flocked pads, as by holding the cartridge in a vertical position, forward or open end down, and slapping the backside or bottom portion of the cartridge housing against the plam of the hand.

I claim:

1. In a tape cartridge of the type including a transducer head cleaning tape and at least one opening in the cartridge housing receiving a transducer head during player operation thereof, the improvement comprising:

a flocked pad within said cartridge housing arranged proximate said opening in a position spaced from and beneath a received transducer head so as to entrap and thetreby retain loose debris produced by the coaction of said transducer head cleaning tape and transducer head during player operation of said cartridge, said flocked pad situated on the bottom cover portion of said cartridge housing adjacent said one opening.

2. A tape cartridge as defined in claim 1 wherein said flocked pad comprises a backing material supporting a grouping of vertically oriented fibers extending therefrom.

3. In an endless loop tape cartridge of the type having at least one opening in the forward end portion of the cartridge housing receiving a transducer head for coaction with traveling transducer head cleaning tape during operation of said cartridge, the improvement comprising:

means including a debris catching pad positioned within said housing and proximate said opening so as to be spaced from and beneath a received transducer head during operation of said cartridge, said debris catching pad comprising a backing substance supporting a grouping of vertically oriented fibers extending therefrom.

4. An endless loop tape cartridge as defined in claim 3 wherein said debris catching pad comprises a backing substance supporting a grouping of vertically oriented fibers extending therefrom.

5. In an endless loop tape cartridge of the type having two openings in the cartridge housing through which operating means in an associated player apparatus are received for cooperative engagement with a head cleaning tape drawn thereacross during operation of the cartridge, the improvement comprising:

flocked pad means situated within said cartridge housing adjacent each of said openings in a position to be spaced from and beneath said received operating means, said pad means comprising a backing material supporting a grouping of vertically oriented fibers extending upwardly therefrom.

References Cited

UNITED STATES PATENTS

| | | | |
|---|---|---|---|
| 1,007,272 | 10/1911 | Crease | 51—270 |
| 3,397,517 | 8/1968 | DeVigan | 55—400 |
| 2,992,447 | 7/1961 | Hicks | 15—210 |

SAMUEL S. MATTHEWS, Primary Examiner

UNITED STATES PATENT OFFICE
CERTIFICATE OF CORRECTION

Patent No. 3,537,710 Dated November 3, 1970

Inventor(s) Warren R. Isom

It is certified that error appears in the above-identified patent and that said Letters Patent are hereby corrected as shown below:

In Column 1, line 11, "blocked" should read -- flocked --.

SIGNED AND
SEALED
JAN 19 1971

(SEAL)
Attest:

Edward M. Fletcher, Jr.
Attesting Officer

WILLIAM E. SCHUYLER, JR.
Commissioner of Patents